United States Patent [19]

Esser

[11] 4,419,806

[45] Dec. 13, 1983

[54] TOOL CHANGING DEVICE ON MACHINE TOOLS, PARTICULARLY ON HORIZONTAL BORING AND MILLING MACHINES

[75] Inventor: Karl-Josef Esser, Monchen-Gladbach, Fed. Rep. of Germany

[73] Assignee: Scharmann GmbH & Co., Monchen-Gladbach, Fed. Rep. of Germany

[21] Appl. No.: 214,632

[22] Filed: Dec. 10, 1980

[30] Foreign Application Priority Data

Dec. 15, 1979 [DE] Fed. Rep. of Germany ....... 2950577

[51] Int. Cl.³ ............................................ B23Q 3/157
[52] U.S. Cl. ...................................... 29/568; 414/732
[58] Field of Search ........................... 29/568, 48.5 R; 414/732, 736, 738; 74/479, 665 B

[56] References Cited

U.S. PATENT DOCUMENTS

| | | | |
|---|---|---|---|
| 3,348,298 | 10/1967 | Sedgwick | 29/568 |
| 4,156,962 | 6/1979 | Haller | 29/568 |
| 4,288,192 | 9/1981 | Geiger et al. | 414/736 |
| 4,344,220 | 8/1982 | Sachot | 29/568 |

FOREIGN PATENT DOCUMENTS 2410534  8/1979  France .................................. 29/568

*Primary Examiner*—Z. R. Bilinsky
*Assistant Examiner*—Daniel W. Howell
*Attorney, Agent, or Firm*—Becker & Becker, Inc.

[57] ABSTRACT

A tool changing device on machine tools, particularly on horizontal boring and milling machines having a drilling spindle. The device includes a dual-arm changing arm rotatable about its horizontal axis and provided on both ends with a grasping device. The changing arm is arranged rotatable on a pivotable pivot arm about an axis of the pivot arm parallel to the changing arm axis. The pivot arm is adjustable in the axial direction. The changing arm carries out rotational movements on the pivot arm during pivoting of the pivot arm (superimposed movements). The grasping device at one changing arm end describes a flat compound curve, or follows the connecting line between the starting and end positions. For fully automatic changing of tools from a drilling spindle and a tool magazine, both grasping devices simultaneously describe a flat compound curve between their starting position and the drilling spindle axis, and their starting position and the tool of the magazine to be grasped, or follow the connecting lines between these parts.

7 Claims, 22 Drawing Figures

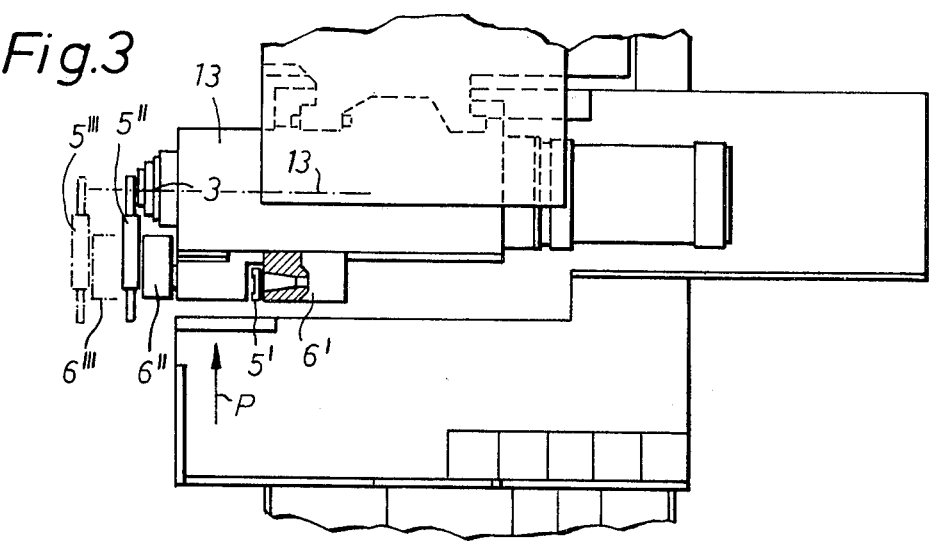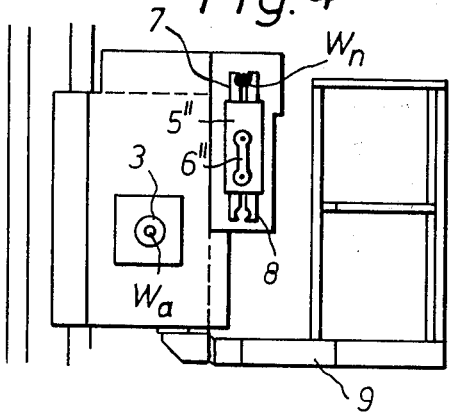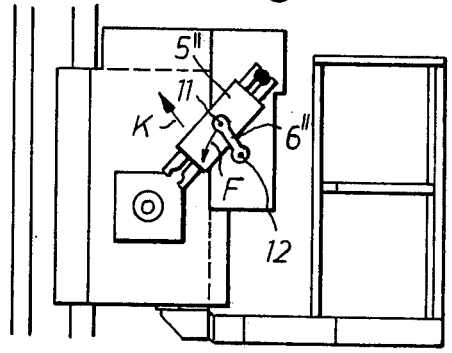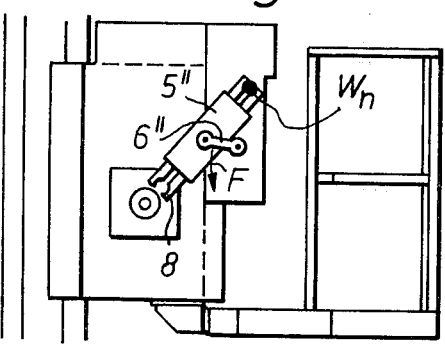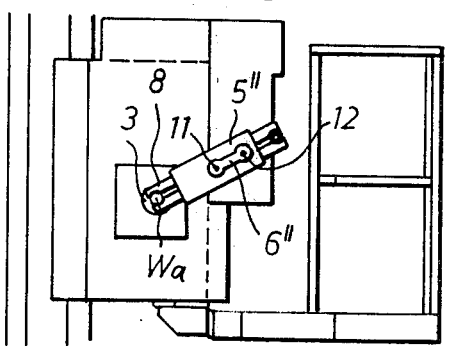

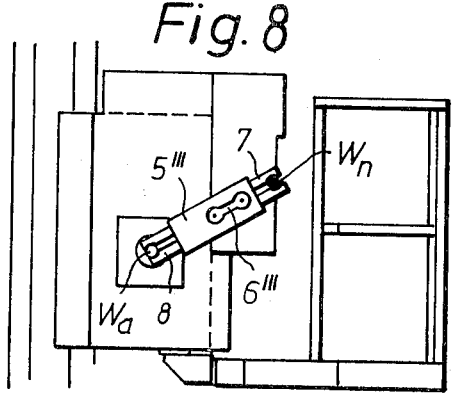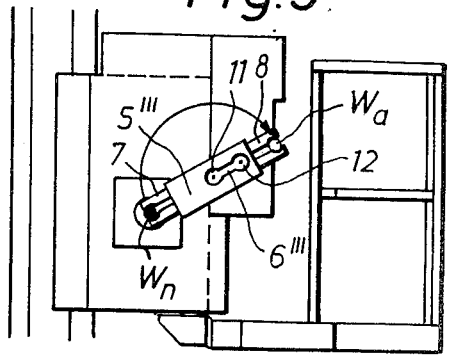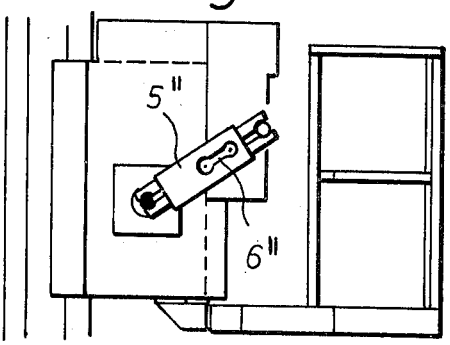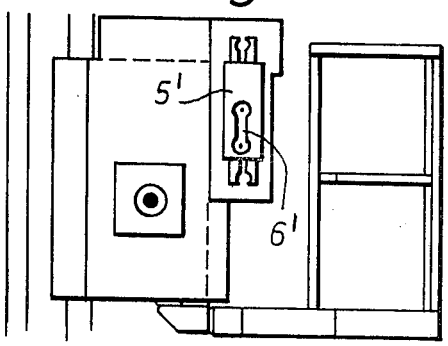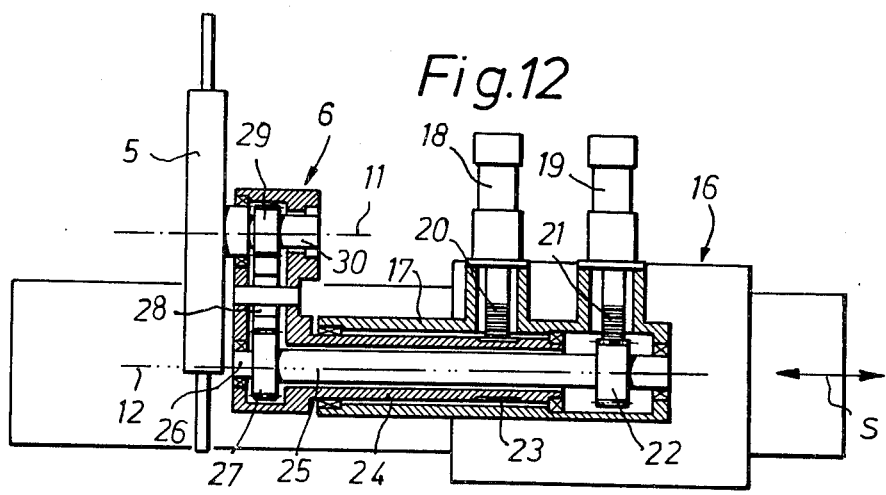

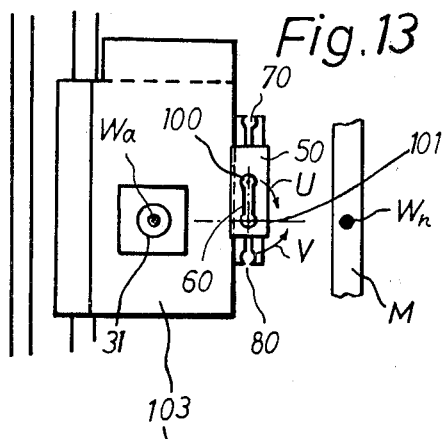
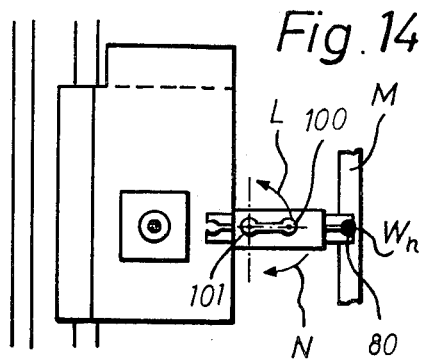
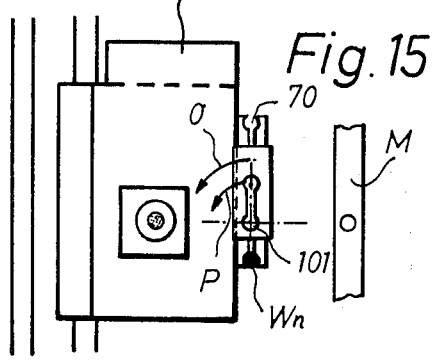
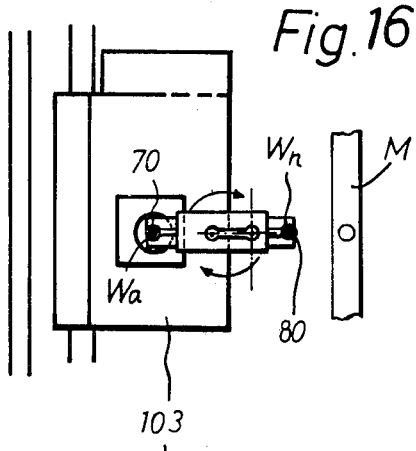
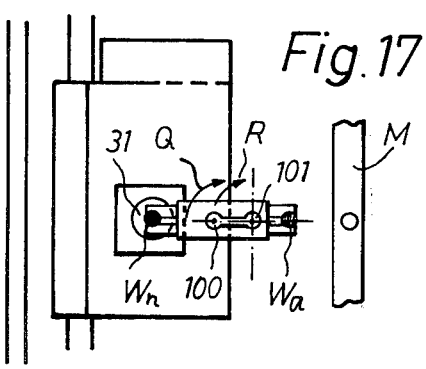
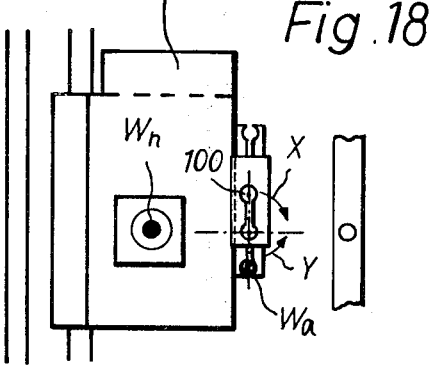

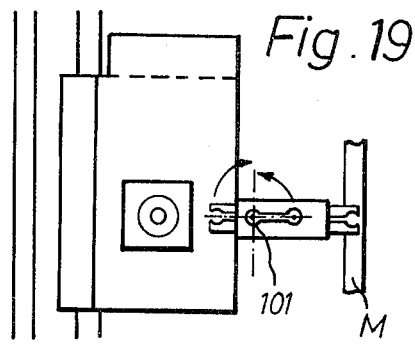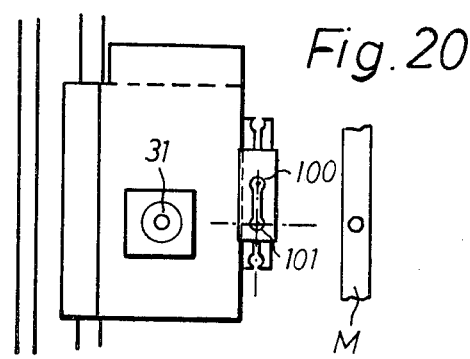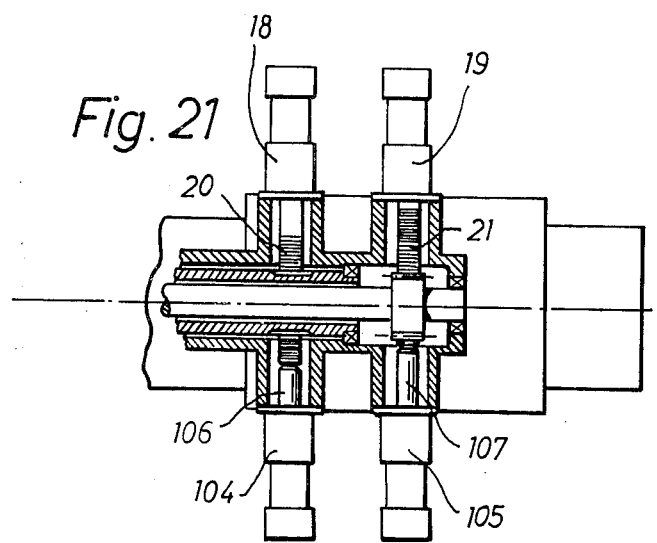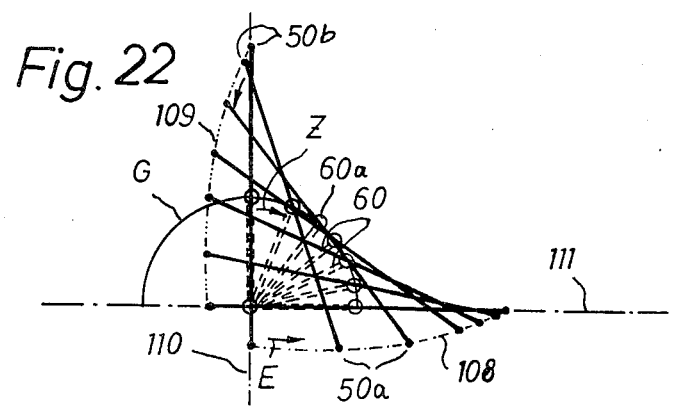

TOOL CHANGING DEVICE ON MACHINE TOOLS, PARTICULARLY ON HORIZONTAL BORING AND MILLING MACHINES

The present invention relates to a tool changing device on machine tools, particularly on horizontal boring and milling machines having a drilling spindle. The device includes a dual-arm changing arm rotatable about its horizontal axis and having a grasping device on both ends thereof. The changing arm is rotatably arranged on a pivot arm which is adjustable in the axial direction and is pivotable about an axis parallel to the axis of the changing arm.

U.S. Pat. No. 3,348,298 Sedgwick dated Oct. 24, 1967 discloses such a device. With this device, as well as with the device according to German Offenlegungsschriften Nos. 2,844,319 and 2,629,835, (corresponding to Swiss No. 4336/76 and corresponding to U.S. Pat. No. 4,156,952-Haller dated June 5, 1979) the pivot arm first completes a pivot movement with which the changing arm is kept immovable on the pivot arm. The changing arm thereafter completes its rotary or rotational movement. Axial movements for withdrawal and insertion of the tools into the spindle or into a magazine are associated with the pivot movements and rotary movements of the pivot arm and of the changing arm.

In contrast with the foregoing known devices, it is an object of the present invention to provide a device with which the operator, insofar as the device is embodied and operates as a semi-automatic device, can come close to a grasping device of the changing arm in its starting position in order to be able to replace the used tool with a new tool. With a completely automatic device, a transfer device from a magazine and the like is to be eliminated, and the magazine, for space saving purposes, is to be arranged close to the tool carrier, for instance, on the head-stock, at the same height or behind the tool carrier. The pivoting of the tools over large radii is likewise to be avoided, as are large acceleration forces on the changing arm and on the tools. The changing of the tools is thus to occur in a time-saving manner. Collectively, the foregoing requirements are to be resolved with constructively simple means.

These and other objects and advantages of the present invention will appear more clearly from the following specification in connection with the accompanying drawings, in which:

FIG. 3 is a plan view of a boring and milling machine with the drive parts of the dual-arm changing arm as well as of the pivot arm;

FIGS. 4 through 11 show individual positions of the changing arm as well as of the pivot arm, and for clarification purposes, the pivot arm is illustrated before the changing arm;

FIG. 12 illustrates the drive device of the two arms in an enlarged scale compared with FIG. 2;

FIGS. 13 through 20 show individual positions of the changing arm and of the pivot arm with a fully automatic device;

FIG. 21 illustrates the embodiment of a drive device of the two arms with respectively one arresting device of the arms in a particular position; and FIG. 22 illustrates the flat compound curves or paths described by the grasping devices at the ends of a changing arm with simultaneous counter-rotation by 90° or 180° relative to the pivot arm.

Figure 1:
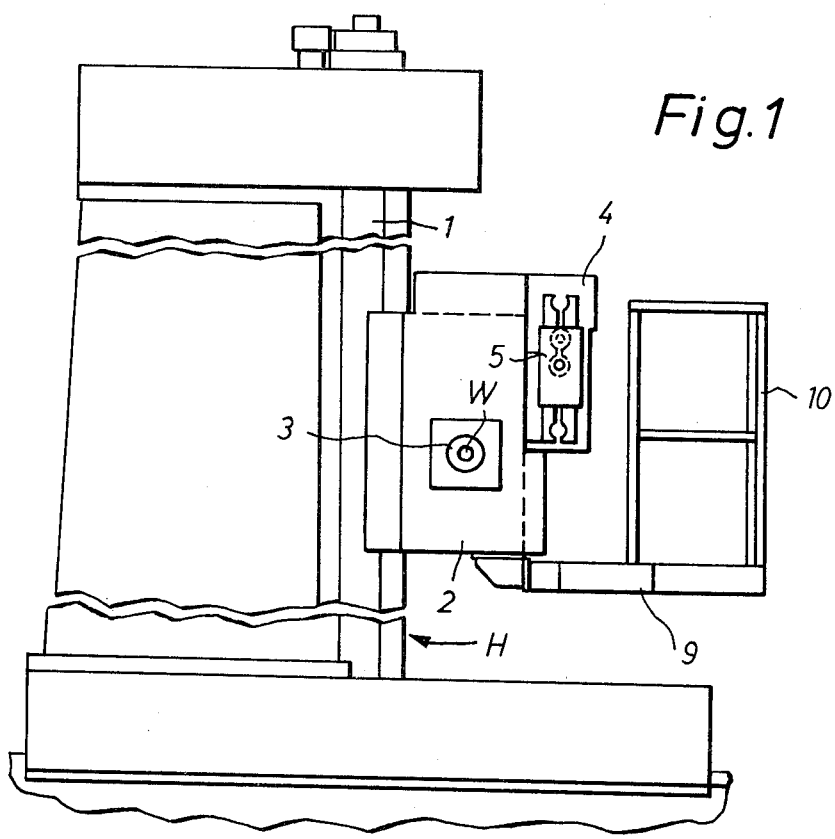
FIG. 1 is a front view of a horizontal boring and milling machine having a semi-automatic tool-changing device with features in accordance with the present invention.

These drawings illustrate sample embodiments of the inventive changing device; in particular, FIGS. 1 through 12 show a semi-automatic machine, and FIGS. 13 through 21 illustrate a completely automatic device.

The tool changing device of the present invention is characterized primarily in that the changing arm carries out rotary movements on the pivot arm during pivoting of the pivot arm (superimposed movements).

The changing arm and the pivot arm may simultaneously carry out opposite rotational movements. The grasping device at one changing arm end may describe a flat compound curve or path, or may follow the connecting line between the starting and end position. For fully automatic changing of tools from a drilling spindle and a tool magazine, features of the present invention may further include that both grasping or engaging devices simultaneously describe a flat compound curve or path between their starting position and the drilling spindle axis on the one hand, and their starting position and the tool of the magazine to be grasped on the other hand, or follow the connecting line between these parts.

The pivot arm may be shorter than the changing arm, and the changing arm may carry out rotational movements of 180° and the pivot arm a back and forth pivot movement of less than 180°. The pivot arm axis may be located at the height or level of the spindle; the pivot arm may complete a pivot movement and the changing arm may simultaneously complete a greater opposite pivot movement.

The foregoing tool changing device may include a hollow shaft for rotating the pivot arm and in which a shaft is journalled for rotating the changing arm, both shafts being respectively driven by a piston-cylinder unit and a toothed rack; both shafts are provided with an external gearing, and both toothed racks are in continuous engagement with their respective gearing. The piston of at least one piston-cylinder unit may be arrestable in an intermediate position between its end positions.

A counter cylinder may be associated with one or both piston-cylinder units, with the piston rods thereof being located on the same axis with the toothed piston rod of the associated piston-cylinder unit, and the end faces of both associated piston rods engage against each other in the intermediate position of the toothed racks of the piston-cylinder units.

The cylinder-piston units may be embodied identically and have the same stroke length, and the toothed racks of the pistons may have a transmission ratio corresponding to the ratio of the rotational movements of the pivot arm to the rotational movement of the changing arm. The piston or the piston rods each have an abutment in their path of movement for determining the middle position of the toothed racks.

These additional features serve for improvement and further development of the foregoing main characterizing feature, and provide an especially advantageous embodiment of the driving means of the pivot arm and of the changing arm.

The superimposed or overlapping pivot and rotational movements of the pivot arm and of the changing arm shorten not only the path of the tools and hence the changing time, but more important, the tools are moved in a space-saving path, which permits arrangement of the parts of the machine close to each other. The tools are moved upon a flat compound curve or path not dissimilar from the extended segment of a parabola, or the tools are moved linearly, as a result of which small centrifugal forces arise which permit a suitable embodiment of the grasping devices.

Figure 2:
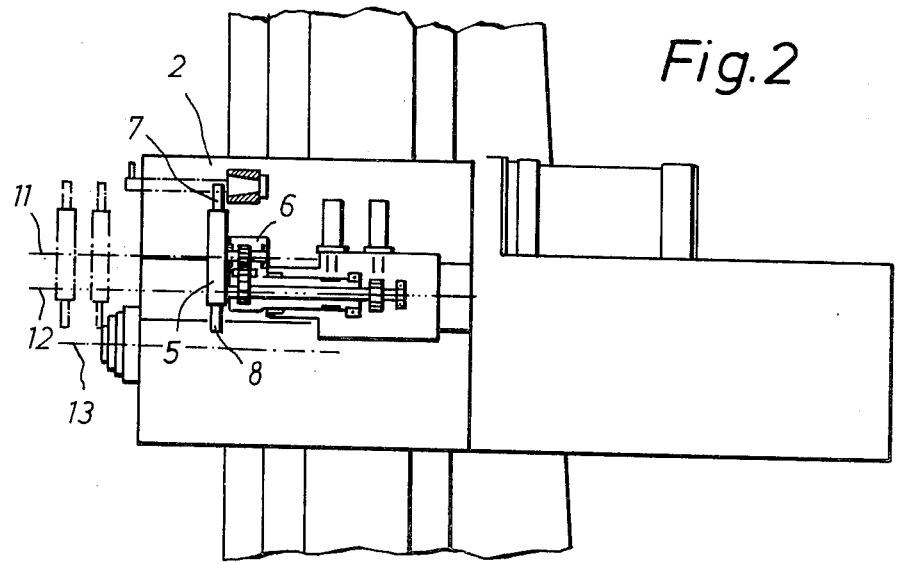
FIG. 2 is a side view of a boring and milling machine with the drive parts of the dual-arm changing arm as well as of the pivot arm.

Referring now to the drawings in detail, a headstock 2 is adjustable in the vertical direction on the vertical stand or upright frame 1 of the horizontal combined boring and milling machine H; the free end of the headstock 2 is provided with the drilling spindle 3 or cutter bar of a boring machine or spindle, which supports the machining tool W. A dual-arm exchanger or tool changing arm 5, and the pivot arm 6, are supported on the housing 4 laterally of the headstock 2 (FIG. 2). The dual-arm tool changing arm 5, the middle of which is supported on the pivot arm 6, has at its ends the two gripping or grasping devices 7, 8, which are of a known arrangement and type. The grasping devices are in a position to respectively receive a tool, and in a manner more closely described in the following paragraphs, to insert such tool either in the drilling spindle 3 or to withdraw the tool therefrom, or to take up a new tool in order to insert the tool in the drilling spindle after rotation of the arm 5 and pivoting of the arm 6.

The underside of the headstock 2 supports a laterally projecting stand or frame platform 9 which can be provided with a frame or rack 10, and serves on the one hand as a working location for the operator, and on the other hand for receiving control and regulating parts, and tools.

On the one hand for the purpose of not permitting the stand or frame platform 9, which is supported by the headstock 2, from becoming too large, and on the other hand for not endangering the operator during rotation of the dual-arm tool changing arm 5, and furthermore to give the operator the possibility of inserting the new tool in the tool changing arm closely adjacent the tool changing arm located in its rest position (FIG. 1), or the possibility of removing the used tool therefrom, the changing arm completes a combined movement resulting from two superimposed or overlapping, i.e. simultaneous opposite, movements; in particular on the one hand from a rotational movement of the arm 5 about its axis 11, and on the other hand from a pivot movement of the arm 6 about its axis 12 in the opposite direction, in which connection the axis 11 is parallel to the axis 12. Both movements are reproduced progressively in the individual views in the sequence of FIGS. 4 through 11. In addition to these movements of the dual-arm changing arm 5 and the pivot arm 6, the same also complete axial movements in the direction of the axis 12 from a position 5' into a position 5", and from here into a position 5''', or from 6' to 6" and 6''', and vice versa, as represented in FIG. 3. In the starting position 5' (or 6'), the operator can change the tools in the vertical or upright position of the changing arm and of the pivot arm. For this purpose, the tool changing arm 5 and the pivot arm 6 are located in a space-saving manner next to the headstock 2. On the other hand, the tools are readily accessible in this starting position of the arms 5 and 6.

From the starting position 5', 6' (FIG. 3), in which both arms 5,6 are parallel and at right angles to each other, and in which the arm 5 supports a new tool $W_n$, both arms are first advanced or fed axially into the position 5", 6" (FIG. 4). After reaching this position, the tool changing arm 5 rotates in the direction of the arrow K, i.e. clockwise, about the axis 11, while simultaneously the pivot arm 6, which is considerably shorter than the changing arm 5, carries out an opposite pivot movement in the direction of the arrow F, i.e. counterclockwise. After termination of the two superimposed or overlying movements in the direction of the arrows K and F by the arms 5, 6, these arms occupy the position according to FIG. 7 in which the since opened grasping device 8 can grasp or engage the used tool $W_a$ in the drilling spindle 3. During a further axial movement of the arms into the positions 5''' and 6''', the used tool $W_a$ is withdrawn from the drilling spindle 3 (FIG. 8).

In this frontmost position 5''', 6''' of the arms, there is required a rotation of the changing arm 5 by 180 degrees in order to bring the new tool $W_a$ into an axially identical position with the middle axis 13 of the drilling spindle 3 (FIGS. 2 and 3). For this purpose, the changing arm 5 rotates around its axis 11 (see FIG. 9) while the pivot arm 6 stands still, so that now the new tool $W_a$, during retraction of the arms 5, 6 into the positions 5", 6", can be inserted into the receiving cone of the drilling spindle 3. After opening the grasping device 7, after the holding device of the spindle 3 has engaged or grasped the new tool $W_a$, the arms 5, 6 can again be positioned upright or vertically according to FIGS. 10 and 11, and can be pivoted back into the starting position 5', 6' according to FIG. 3, and can be retracted axially. The rotational and pivot movements occur oppositely and superimposed. In the starting position 5', 6' next to the headstock 2, the operator can replace the used tool and can insert or install a new tool in the arm 5. The operation of the grasping or engaging devices 7, 8 is not described in detail, and can be carried out in a known manner.

The drive parts of the two arms 5, 6 are arranged on a part 16 which can be advanced or fed and retracted by way of non-illustrated means, for instance a piston-cylinder unit or actuator, in the direction of the double arrow S (FIG. 12), so that the arms 5, 6 can occupy the positions 5', 6' through 5''', 6'''. The part 16 is provided with a housing 17, the rear segment of which supports two piston-cylinder units or actuators 18, 19 the pistons of which are embodied as toothed rods or racks 20, 21, or actuate such toothed racks, which drive a pinion or gear 22 and a toothed means or gearing 23 of a rotary sleeve 24, which is journalled in the housing 17. A drive shaft 25 is journalled horizontally in this rotary sleeve 24, and the pinion 22 is installed secure against rotation on the drive shaft 25. Upon actuation of the piston-cylinder units 18, 19 accordingly, on the one hand the sleeve 24, and on the other hand the shaft 25, can be caused to rotate. Also, the corresponding parts can be arrested or stopped by means of the two piston-cylinder units 18, 19.

The front segment of the rotary sleeve 24 is provided with the pivot arm 6 embodied as a hollow part. The shaft 25 is journalled at 26 therein and receives a gear 27 which is connected with the shaft 25 in a rotationally secure manner. A further gear 29 is driven by an intermediate gear or pinion 28, and is arranged in a rotationally secure manner on a rotary pin 30, at the front end of which the pivot arm 5 is attached in a rotationally secure manner.

For the purpose of effecting the coordinated movements of the two arms 5, 6 from the position according to FIG. 4 into the position according to FIG. 7, the shaft 25 is first rigidly or securely held by means of the cylinder-piston unit 19 and the toothed rack 21, so that the gear 29 completes a planetary gear movement about the gear 27, which represents a sun gear or wheel standing still, when the sleeve 24 is rotated by the toothed rack 20. In so doing, the pivot arm 6 pivots in the direction of the arrow F, and the arm 5 pivots in the direction of the arrow K (FIG. 5).

For the purpose of completing the rotational movement of the changing arm 5 by 180° according to FIG. 9, the piston-cylinder unit 18 is fixed so that the sleeve 24 is arrested or stopped, while the piston-cylinder unit 19 effects a rotational movement of the shaft 25, so that now solely the rotary pin 30 is turned.

For the purpose of effecting the reset movement of the two arms 5, 6 from the position according to FIG. 10 into the position according to FIG. 11, one proceeds in an analogous manner with superimposed rotational movements of the parts 5, 6.

The foregoing described apparatus is provided for semi-automatic operation.

FIGS. 13 through 20 illustrate the manner of operation of a fully automatic changing device with a changing arm 50 and a pivot arm 60. The changing arm 50 again is more than twice as long as the pivot arm 60, is rotatably journalled in the middle thereof on the pivot arm 60, and supports at its ends the engagement or grasping devices 70 and 80.

The unused tools are removable from a magazine M and are supplied to the drilling spindle 31, or the used tool is removed from the drilling spindle 31 and forwarded to the magazine M.

With this embodiment too, simultaneously opposite rotational movements of the changing arm 50 and of the turning arm 60 are carried out. The changing is accomplished in detail as follows: in the position according to FIG. 13, the changing arm 50 and the pivot arm 60 occupy an upright or vertical starting position parallel to each other. The grasping devices 70 and 80 are empty. The used tool $W_a$ is inserted in the drilling spindle 31, and the new tool $W_n$ is located in the magazine M. By opposite simultaneous rotation or pivoting of the arms 50 and 60 corresponding to the arrows U and V in FIG. 13 about the axes 100 and 101, which are located parallel to each other, the parts pass into the position according to FIG. 14, in which the grasping device 80 grasps the unused tool $W_n$, and from which again superimposed rotational and pivot movements occur according to the arrows L, N, which bring the parts into the position according to FIG. 15. For the purpose of engaging or grasping the used tool $W_a$, both arms simultaneously complete identically directed movements according to the arrows O, P into the position according to FIG. 16, in which the grasping device 70 grasps the tool $W_a$ in the drilling spindle 31, so that both grasping devices 70, 80 respectively support a tool, and a turning or rotation of the changing arm 50 by 180° while the arm 60 stands still brings about positioning of the new tool $W_n$ at the height or level of the spindle 31, and the used tool $W_a$ at the height or level of the magazine M (FIG. 17), after which both arms 50, 60, by rotation according to the arrows Q, R, pass into the position according to FIG. 18. For delivering the tool $W_a$ to the magazine M, superimposed movements again occur according to the arrows X, Y into the position according to FIG. 19, and thereafter, likewise by superimposed movements into the common alignment of the arms in the starting position according to FIGS. 13 and 20. The axial movement necessary for removing or inserting the tools from or into the drilling spindle 31, as well as into or from the magazine M, occurs after termination of the corresponding pivot movements and rotational movements of the arms 50, 60. The magazine M can be arranged more or less laterally behind the headstock 103, so that the positions of the arms 50, 60 result laterally behind the headstock 103 according to FIGS. 14 and 19, and only the rotational and pivot procedure according to FIGS. 15 through 18 occurs before the headstock 103.

As with the embodiment according to FIG. 12, the toothed rack 20 is effective together with the pivot arm 60, while the toothed rack 21 actuates the changing arm 50. The piston-cylinder unit or actuator means 18, 19, as in FIG. 12, are in turn identically embodied and with the same rods or bars. Since the pivot arm 60 carries out a smaller angular movement than does the changing arm 50, the transmission ratio of the toothed racks 20, 21 is selected correspondingly with respect to each other. If the pivot arm 60 completes or carries out movements beyond 90°, and the changing arm 50 movements beyond 180°, as with the example according to FIGS. 13 through 20, then the transmission ratio of both toothed racks 20, 21 is 1:2.

To obtain the middle position of the pivot arm 60, for instance according to FIGS. 13, 15, and 18, an oppositely located piston-cylinder unit or actuator 104 is associated with the piston-cylinder unit 18 and has a piston rod 106 which is coaxial with the toothed rack 20 and which, during extension, moves against an abutment (not illustrated) which determines the middle position of the pivot arm 60, whereby the end faces of the parts 20, 106 engage one another. After retraction of the piston rod 106, the toothed rack 20 can be extended completely, and accordingly the pivoting of the arm 60 is effected in a direction whereby the path of the piston in the piston-cylinder unit 18 is limited. To turn the arm 60 in the other pivot direction out of the middle position, the toothed rack is moved into its other position, likewise determined by the end position of the piston in the cylinder 18.

The same is true for turning or rotating the changing arm 50, whereby a counter cylinder-piston unit or actuator means 105 having a piston rod 107 coaxial with respect to the toothed rack 21 is associated with the piston-cylinder unit 19. Also here this piston rod, which is arrestable by means of an abutment, assures or provides for the middle positioning of the changing arm 50, from which, upon complete retraction or extension, a complete rotational movement, for instance of 180°, is completed on the basis of the transmission ratio of the toothed rack 20 relative to the gear or pinion. Also here the end positions of the changing arm are determined by the end positions of the piston of the piston-cylinder unit 19.

FIG. 22 illustrates in one example the movement of the arms 50, 60, in which connection the pivot arm 60 is represented by two dashed lines, and that end 60a thereof which supports the changing arm 50 moves clockwise in the direction of the arrow Z over the circular arc or path G. The end 50a of the changing arm 50 (illustrated in a full line) moves along the compound curve or path 108 in the direction of the arrow E, while the end 50b describes the compound curve or path 109. It is recognizable that both arm ends 50a and 50b extend substantially and nearly parallel to the planes 110, 111 in which the changing arm 50 is located in its starting position and in its end position respectively.

The present invention is, of course, in no way restricted to the specific disclosure of the specification and drawings, but also encompasses any modifications within the scope of the appended claims.

What I claim is:

1. A tool changing device for use with machine tools such as horizontal boring and milling machines having a headstock and drilling spindle, wherein the device exchanges tools between a tool supply and the drilling spindle, the device comprising in combination:
   a base;
   a carriage mounted on the base for reciprocation in the axial direction of the head stock and drilling spindle;
   a pivot arm having a hollow mounting sleeve and a lateral portion, the hollow mounting sleeve being secured to said carriage for rotation only with respect thereto and having gear teeth therearound;
   a first hydraulic cylinder mounted on the carriage and having a first toothed rack always only meshed with the gear teeth on the hollow mounting sleeve for rotating the pivot arm;
   a shaft extending through the hollow mounting sleeve and having gear teeth at both ends thereof, the shaft being secured in the hollow mounting sleeve for rotation only with respect thereto;
   a second hydraulic cylinder mounted on the carriage and having a second toothed rack always only meshed with the gear teeth on one end of the shaft for rotating the shaft;
   a pinion journaled in the lateral portion of the pivot arm and meshing with the gear teeth at the other end of the shaft;
   a gear journaled on the lateral portion of the pivot arm and meshed with the pinion, the gear having a mounting shaft projecting from the lateral portion of the pivot arm;
   a tool changing arm having two ends with tool grasping members thereon, the tool changing arm being mounted midway its ends on the mounting shaft for rotation by the mounting shaft in a direction opposite that of the pivot arm as the pivot arm rotates; whereby the device inserts and withdraws tools as the carriage reciprocates and the tool changing arm rotates in the opposite direction of the pivot arm when being positioned to align the grasping members with the drilling spindle and tool supply.

2. The tool changing device of claim 1 wherein the tool supply is a magazine positioned adjacent to the horizontal boring and milling machine and supports a plurality of tools in parallel with the tool in the drilling spindle.

3. The tool changing device of claim 1 wherein the tool changing arm is more than twice the length of the pivot arm and wherein the ratios of the gears is selected so that the arcs followed by the grasping members follow flat compound curves.

4. The tool changing device of claim 3 wherein the gear ratios are selected so that the tool changing arm undergoes a rotary movement of about 180° while the pivot arm reciprocates through an arc of less than 180°.

5. The device of claim 1 further including additional hydraulic cylinders having toothed racks coaxial with the toothed racks of the first and second cylinders, the additional hydraulic cylinders being mounted in opposition to the first and second cylinders.

6. The tool changing device of claim 5 wherein the hydraulic cylinders have the same stroke length.

7. The tool changing device of claim 5 further including abutment means in the path of movement of said racks for determining the middle position of the rack.

* * * * *